May 8, 1934.  H. T. HUNTER  1,957,961
COATING APPARATUS
Filed Feb. 5, 1932  3 Sheets-Sheet 1
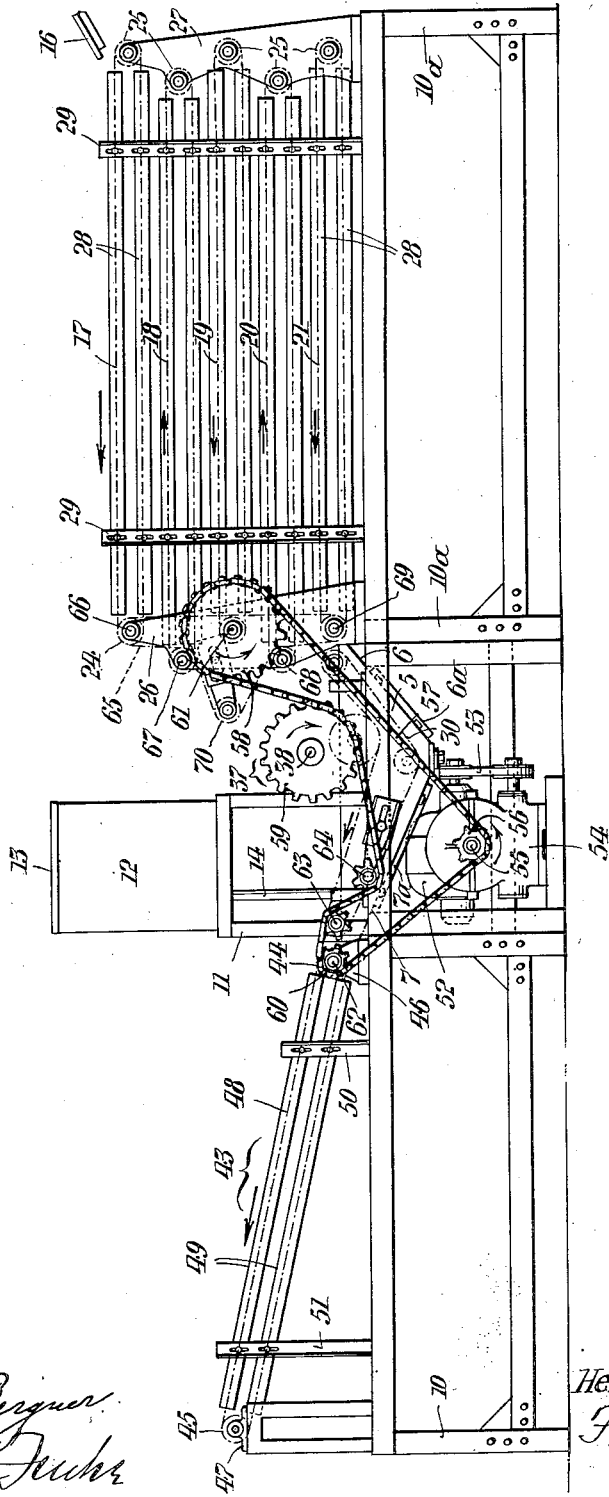
INVENTOR:
Herbert T. Hunter,
Fraley & Paul
ATTORNEYS.

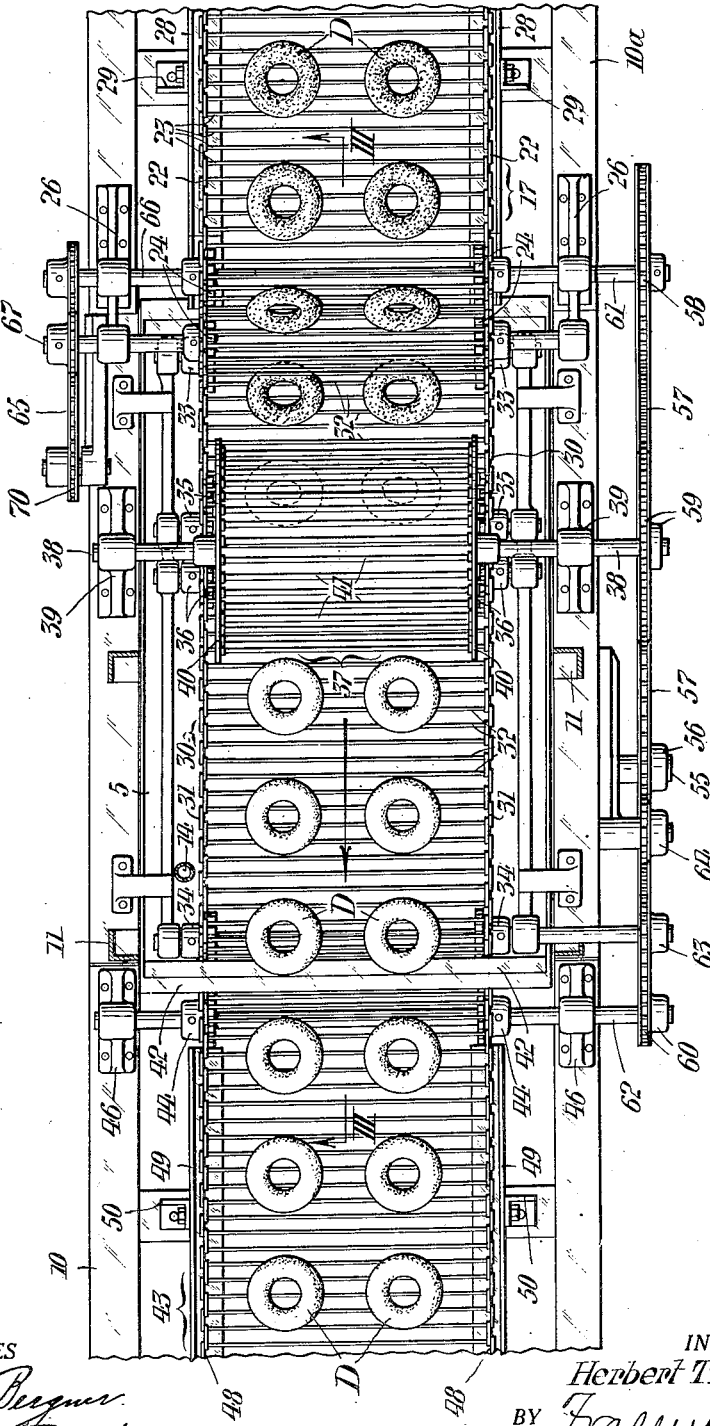

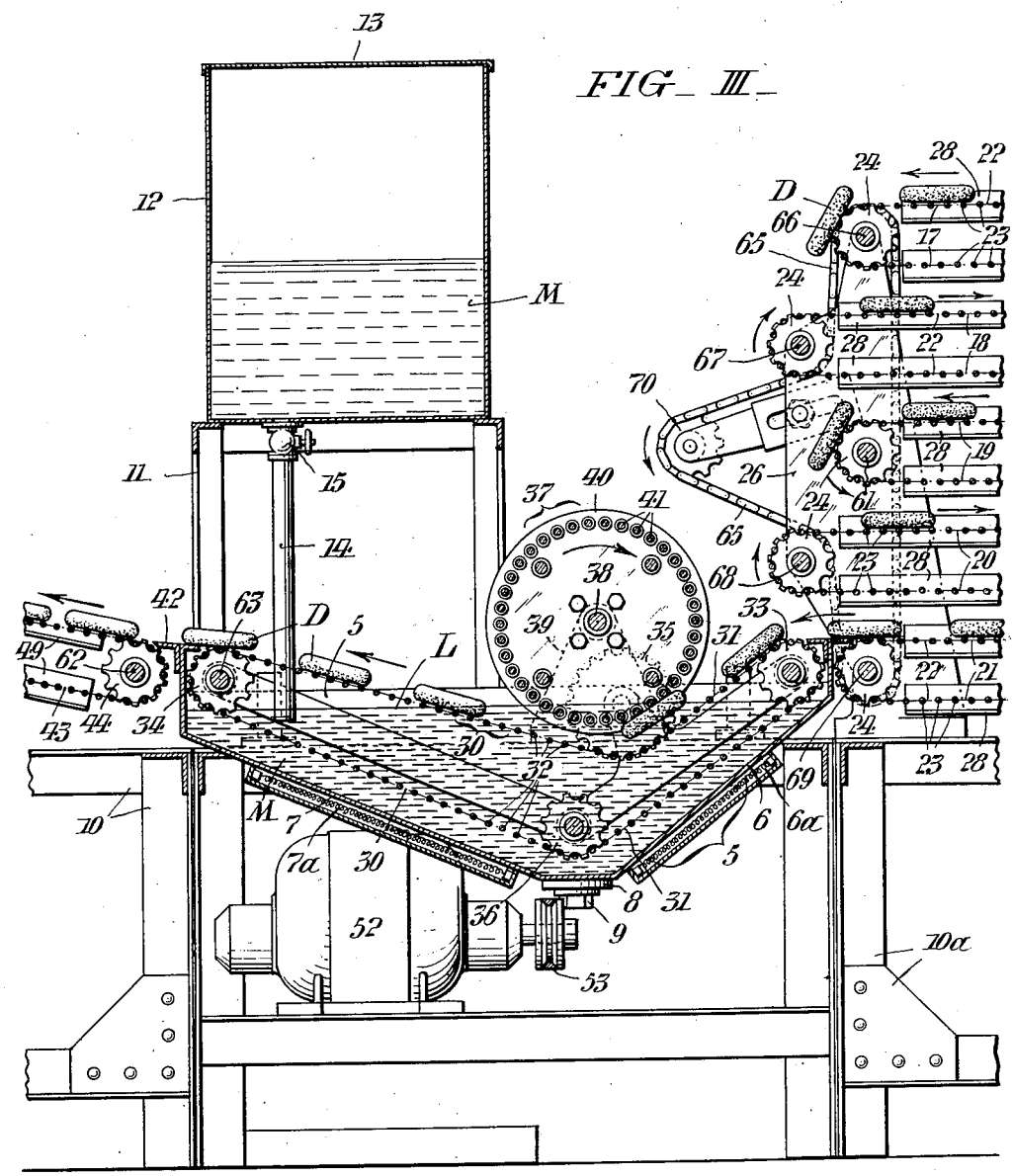

Patented May 8, 1934

1,957,961

UNITED STATES PATENT OFFICE 1,957,961

COATING APPARATUS

Herbert T. Hunter, Baltimore, Md., assignor to Doughnut Machine Corporation, New York, N. Y., a corporation of New York Application February 5, 1932, Serial No. 591,005

3 Claims. (Cl. 91—4)

This invention relates to apparatus for coating food products such as doughnuts and the like.

Broadly speaking, the present invention is directed toward the provision of a simple, compact and reliable apparatus, whereby doughnuts and similar buoyant articles received in definite succession from a producing machine, may be coated with fluid or semi-fluid glazing material like diluted sugar or chocolate paste, similarly in definite succession, with assurance of an even application of the coating material.

In connection with apparatus of the character referred to, capable of accomplishing the coating without injury to or deformation of the articles, I further aim to provide for effective cooling of the articles before coating, so that subsequent congealing and hardening of the glazing material may be effected in a minimum space of time.

Still other objects and attendant advantages of this invention will be manifest from the detailed description following of the attached drawings, wherein Fig. I shows a side elevation of a coating apparatus conveniently embodying the present improvements.

Fig. II is a partial plan view of the apparatus drawn to a larger scale; and

Fig. III shows a partial longitudinal sectional view of the apparatus taken as indicated by the arrows III—III in Fig. II.

As herein delineated, the coating apparatus of my invention comprises a receptacle 5 with end walls 6 and 7 sloping toward a bottom drain outlet 8 which is fitted with a removable plug 9. From Figs. I and III it will be observed that the receptacle 5 is supported substantially midway of the length of a frame work 10 built up from structural iron. Mounted atop a super-structure 11 above the receptacle 5, is a storage reservoir 12 for glaze coating material M which may, for example, be a diluted sugar or chocolate paste, the said reservoir having a removable air-tight cover 13. The material M is conducted from the reservoir 12 into the receptacle 5 through a siphoning pipe 14 whereby the supply in said receptacle is automatically maintained at a constant level at L. A hand valve shown at 15 is interposed in the pipe 14 to prevent draining of the reservoir 12 during filling thereof as required from time to time. At 6a and 7a in Fig. III, I have conventionally shown electric units along the sloping end walls 6 and 7 of the receptacle 5 as a means to keep the coating material M in molten condition.

Fresh cooked doughnuts D periodically discharged in transverse pairs onto a chute 16 by a producing machine (not illustrated), are received by the uppermost of a series of endless horizontally-disposed conveyors 17, 18, 19, 20 and 21 arranged one above another, as shown in Figs. I and III. Each of these conveyors 17—21 consists of a pair of laterally-spaced sprocket chains 22 connected by cross bars 23 on which the transverse pairs of the doughnuts D are supported in definite separation as they are received from the producing machine. As shown in Figs. I and III, the conveyors 17—21 are trained about end sprockets 24, 25 whereof the shafts are journalled in brackets 26, 27 upstanding from the wind 10a of frame-work 10 rightward of the receptacle 5, the respective chains of the conveyors being sustained against sagging by angle iron guides 28 which are supported, with capacity for vertical adjustment, by uprights 29 on said frame-work 10. By suitable drive means later on described, the unevenly numbered conveyors 17, 19 and 21 are driven in one direction, and the evenly numbered conveyors 18 and 20 in the opposite direction as indicated by the arrows in Figs. I and III. It is to be particularly noted that the conveyors 18 and 20 extend beyond the conveyors 17 and 19 at their left hand ends, so that, in dropping off the conveyors 17 and 19 incident to progression from right to left, the doughnuts D are intercepted by the intervening conveyors 18 and 20. Similarly, at their right hand ends, the conveyors 19 and 21 reach beyond the conveyors 18 and 20 so as to receive the doughnuts D from the conveyors 18 and 20 after having been progressed from left to right by the latter conveyors. Thus, by the conveying system just described, the doughnuts D are progressed in definite separation, over a circuitous course, and accordingly subjected for an ample length of time to the cooling action of air, before being coated in the receptacle 5.

After being cooled in the manner above explained, the doughnuts D are successively transferred by the lowermost conveyor of the series 17—21, to a conveyor 30 within the receptacle 5. Like the conveyors 17—21, the conveyor 30 consists of a pair of spaced side chains 31 with connecting cross bars 32 for supporting the doughnuts. As shown, the chains 31 of the conveyor 30 are trained over end sprockets 33 and 34, positioned above the level L of the coating material M in the receptacle 5 and under submerged guide sprockets 35 and 36 which respectively engage the upper and lower runs of said chains at an intermediate point. By virtue of the described allocation of the guide sprockets 35 and 36, the conveyor 30 is caused to first steep downwardly at an angle into the coating material M in the receptacle 5 and thereafter to rise again, likewise through an angle, toward the discharge end of said receptacle.

Mounted over the receptacle 5 at the region of the intermediate guide sprockets 35 and 36 of the conveyor 30, is a transversely-positioned circumferentially-intersticed rotary drum 37 whereof the axial shaft 38 is journalled at opposite ends in fixed bearing brackets 39 upstanding from the top rails of the frame 10. As shown in Figs. II and III, this drum 37 comprises circular end disks 40 which are joined by a series of circumferentially arranged bars 41, and it will be noted from Fig. III that the said drum dips into the coating material M in the receptacle 5 at the region of the guide sprocket 35 while the doughnuts D are free of the conveyor 30. Accordingly, during rotation of the drum clockwise in Fig. III, the doughnuts D are engaged by the circumferential bars 41 of said drum and submerged against their buoyancy in the coating material M, and at the same time advanced from right to left in the receptacle 5. Due to the open construction of the drum 37, the coating material is permitted to flow freely over the tops of the doughnuts D incident to their submergence, so that they become uniformly coated all over.

Upon rising from beneath the drum 37, the doughnuts D are re-engaged by the rising portion of the conveyor 30 and elevated to the level of a ledge 42 at the discharge end of the receptacle 5, from which ledge they are subsequently received by another conveyor 43, which, as shown in Figs. I and III, is of the same construction as the other conveyors already described. The conveyor 43 is confined to an upwardly inclined course by end sprockets 44 and 45 whereof the shafts are journalled in suitable bearings 46 on the top rail of the frame 10 leftward of the receptacle 5; while its side chains 48 are prevented from sagging by angle guide strips 49, which are supported with capacity for vertical adjustment by fixed uprights 50 and 51. Incident to progression by the conveyor 43, the coating material on the doughnuts D is afforded an opportunity to congeal and harden before the doughnuts are finally discharged from the apparatus.

To insure maintenance of the doughnuts in definite separation throughout their progression in the apparatus, the conveyors 17—21, 30 and 43, and the drum 37, are all synchronously actuated at a uniform surface speed, by a drive system including an electric motor 52 which is centrally mounted within the framework 10, beneath the receptacle 5, and which is coordinated, by means of a belt 53, to a speed reduction gearing unit shown at 54 in Fig. I. To the slow speed shaft 55 of this unit 54 is secured a sprocket wheel 56, which, through a sprocket chain 57, drives sprocket wheels 58, 59 and 60 respectively on the shaft 61 of the conveyor 19, the shaft 38 of the rotary drum 37, and the shaft 62 of the delivery conveyor 43. A pair of idler sprockets 63, 64 serve to maintain the chain 57 taut, the sprocket 64 being supported with capacity for positional adjustment on the framework 10. From the shaft 61, motion is transmitted to the other conveyors 17, 18, 20 and 21 of the cooling system, by another sprocket chain 65 which is trained about sprockets respectively secured to the shafts 66, 67, 68 and 69 of the conveyors 17, 18, 20 and 21, see Figs. I and III. Also as shown in Figs. I and III, the chain 65 is maintained taut by an idler sprocket 70 adjustably supported by one of the brackets 26.

From the foregoing it will be seen that my apparatus constitutes a simple and reliable means capable of continuously cooling and uniformly coating articles, such as doughnuts, delivered from a producing machine, with assurance against direct contact between the individual articles as well as against the possibility of their becoming deformed or damaged in the operation.

Having thus described my invention, I claim:

1. In apparatus for coating articles such as doughnuts, a receptacle containing liquid coating material; means for heating the coating material in the receptacle; a conveyor for progressing the articles in the receptacle, said conveyor passing into the coating material at the entrant end of the receptacle to a point intermediate the ends of the latter, and rising again toward the discharge end of the receptacle; and a circumferentially intersticed centrally-arranged rotary depressing drum with its circumference spaced from the conveyor by a distance which will permit submergence of the articles against their buoyancy in the coating material, free of contact with said conveyor.

2. In apparatus for coating articles such as doughnuts, a receptacle containing liquid coating material; a conveyor for progressing the articles in the receptacle, the said conveyor passing into the coating material at the entrant end of the receptacle to a point intermediate the length of the latter, and rising again at the discharge end of said receptacle; and a centrally-arranged rotary depressing drum with its circumference spaced from the conveyor by a distance which will permit submergence of the articles against their buoyancy in the coating material, free of contact with said conveyor.

3. In apparatus for coating articles such as doughnuts, a cooling conveyor; means for receiving the doughnuts in definite succession and separation from a producing machine and conveying them over a circuitous course before delivery to the coating receptacle; a conveyor within the receptacle for carrying the articles down into the coating material at the entrant end of the receptacle and for afterwards carrying the articles out of the coating material at the discharge end of said receptacle; a centrally arranged circumferentially-intersticed rotary depressing drum with its circumference spaced from the conveyor by a distance which will permit submergence of the articles against their buoyancy in the coating material free of contact with said conveyor, a delivery conveyor for receiving the coated doughnuts from the conveyor in the receptacle; and drive means for synchronously actuating the several conveyors and the depressing drum aforesaid so that the articles are maintained in definite succession and separation incident to progression in the apparatus.

HERBERT T. HUNTER.